(12) United States Patent
Hudzia et al.

(10) Patent No.: US 8,762,396 B2
(45) Date of Patent: Jun. 24, 2014

(54) DYNAMIC, HIERARCHICAL BLOOM FILTERS FOR NETWORK DATA ROUTING

(75) Inventors: Benoit Hudzia, Belfast (GB); Eoghan O'Neill, Belfast (GB)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/335,625

(22) Filed: Dec. 22, 2011

(65) Prior Publication Data

US 2013/0166576 A1    Jun. 27, 2013

(51) Int. Cl.
*G06F 17/30* (2006.01)

(52) U.S. Cl.
CPC .................................. *G06F 17/3033* (2013.01)
USPC ........... 707/754; 707/711; 707/741; 707/749; 707/776

(58) Field of Classification Search
CPC ....................... G06F 17/3033; G06F 17/30946
USPC ......... 707/754, 696, 711, 741, 749, 755, 764, 707/776; 709/230
See application file for complete search history.

(56) References Cited

U.S. PATENT DOCUMENTS

| | | | |
|---|---|---|---|
| 7,602,785 B2 * | 10/2009 | Dharmapurikar et al. | 370/392 |
| 7,620,781 B2 * | 11/2009 | Breternitz et al. | 711/154 |
| 8,018,940 B2 * | 9/2011 | Hao et al. | 370/392 |
| 8,134,934 B2 * | 3/2012 | Chen et al. | 370/253 |
| 8,239,394 B1 * | 8/2012 | Hogue et al. | 707/754 |
| 8,301,650 B1 * | 10/2012 | Oliver | 707/758 |
| 2006/0072582 A1 | 4/2006 | Bronnimann et al. | |
| 2010/0082648 A1 * | 4/2010 | Potapov et al. | 707/756 |
| 2010/0228701 A1 * | 9/2010 | Harris et al. | 707/683 |
| 2010/0332765 A1 | 12/2010 | Cypher | |
| 2011/0270852 A1 * | 11/2011 | Watanabe et al. | 707/754 |
| 2012/0173510 A1 * | 7/2012 | Risvik et al. | 707/711 |
| 2012/0275466 A1 * | 11/2012 | Bhadra et al. | 370/419 |
| 2012/0303627 A1 * | 11/2012 | Keeton et al. | 707/741 |

OTHER PUBLICATIONS

Extended European Search Report for EP Application No. 12008495.9, mailed Apr. 5, 2013, 6 pages.
Chen, et al, "Distributed Metadata Management Based on Hierarchical Bloom Filters in Data Grid", 2009 Fourth ChinaGrid Annual Conference, Aug. 21, 2009, pp. 95-101.
Antichi, et al, "Counting Bloom Filters for Pattern Matching and Anti-Evasion at the Wire Speed", Netwrk. Mag. of Global Internetwkg., vol. 23, Jan./Feb. 2009, pp. 30-35.
Cohen, et al, "Spectral Bloom Filters", Proceedings of the 2003 ACM SIGMOD International Conference on Management of Data, SIGMOD '03, Jun. 9-12, 2003, pp. 241-252.
Guo, et al, "Receiver-Oriented Design of Bloom Filters for Data-Centric Routing", Comput. Netw., vol. 54, Jan. 2010, pp. 165-174.
Jerzak, et al, "Bloom Filter Based Routing for Content-Based Publish/Subscribe", Proceedings of the Second International Conference on Distributed Event-Based Systems, DEBS '08, 2008, pp. 71-81.
Mitzenmacher, "Compressed Bloom Filters", IEEE/ACM Trans. Netw., vol. 10, Oct. 2002, pp. 604-612.
Rothenberg, et al, "The Deletable Bloom Filter: A New Member of the Bloom Family", Comm. Letters., vol. 14, Jun. 2010, pp. 557-559.

* cited by examiner

*Primary Examiner* — Jay Morrison
*Assistant Examiner* — Dangelino Gortayo
(74) *Attorney, Agent, or Firm* — Brake Hughes Bellermann LLP

(57) ABSTRACT

A system may include an address manager configured to map a data item including a plurality of attributes to a blocked Bloom filter (BBF) of a plurality of blocked Bloom filters. The system also may include a blocked Bloom filter (BBF) generator configured to map each attribute of the plurality of attributes to a corresponding block of the blocked Bloom filter.

22 Claims, 11 Drawing Sheets

DYNAMIC, HIERARCHICAL BLOOM FILTERS FOR NETWORK DATA ROUTING

TECHNICAL FIELD

This description relates to query executions over networks.

BACKGROUND

In peer-to-peer networks and other contexts in which data is transmitted over a computer network, it may be desirable to test for a presence (or lack thereof) of desired data, before actually transmitting the desired data over the network. In this way, for example, network capacity and other network resources may be conserved, and a speed with which desired data is identified and retrieved may be increased. For example, a Bloom filter may be utilized to support the handling of queries which seek to determine whether or not a particular data item is included within a larger dataset.

More specifically, a Bloom filter is a data structure which is designed to include an indicator of existence of a corresponding data item(s) in a corresponding dataset. Thus, a query seeking a particular data item may consult a corresponding Bloom filter to determine whether the desired data item is included within a corresponding dataset. In particular, for example, the Bloom filter may be transmitted to, and stored at, the source of the query. Then, the Bloom filter may be utilized by the query to determine whether the desired data item is present at the remote storage site of the larger dataset. In this way, only queries which are capable of being satisfied using the corresponding dataset need be transmitted to the remote storage site.

Bloom filters are relatively small in size compared to their corresponding dataset, so that fewer network resources are required to transmit a given Bloom filter as compared to its corresponding dataset. Moreover, as previously mentioned, network resources may be conserved by the elimination of the transmission of a significant number of queries which would not have been satisfied in any event. Still further, such Bloom filters are known to provide very fast execution of membership queries, as well as very fast updates or other modifications to the Bloom filter itself.

Bloom filters, however, are prone to providing false positives, thereby erroneously indicating that a specified data item is present within a dataset, when in fact the data item is not present. Consequently, e.g., in the example scenarios described above, such false positive results may result in unnecessary and wasteful transmissions of queries across the network. Moreover, the rate of false positives in a given Bloom filter is generally inversely related to the size of the Bloom filter, so that for the same size datasets a larger Bloom filter may provide fewer false positives than relatively smaller Bloom filters. However, use of larger Bloom filters may mitigate the advantages described above with respect to conservation of network resources and transmission and storage of such Bloom filters. Moreover, conventional Bloom filters must generally be sized at the time of creation and therefore may be difficult or impossible to increase in size without recreating the desired, larger Bloom filter in its entirety. Thus, for these and other reasons, it may be difficult to utilize Bloom filters to facilitate and optimize network queries in a manner which is efficient, dynamic, and convenient for users of such Bloom filters.

SUMMARY

According to one general aspect, a system may include instructions recorded on a computer-readable medium, and executable by at least one processor. The system may include an address manager configured to cause the at least one processor to map a data item including a plurality of attributes to a blocked Bloom filter (BBF) of a plurality of blocked Bloom filters, and a blocked Bloom filter (BBF) generator configured to cause the at least one processor to map each attribute of the plurality of attributes to a corresponding block of the blocked Bloom filter.

According to another general aspect, a computer-implemented method for executing instructions stored on a computer readable storage medium may be executed. The method may include mapping a data item including a plurality of attributes to a blocked Bloom filter (BBF) of a plurality of blocked Bloom filters, and mapping each attribute of the plurality of attributes to a block of the blocked Bloom filter.

According to another general aspect, a computer program product may be tangibly embodied on a computer-readable storage medium. The computer program product may include instructions that, when executed, are configured to map a data item including a plurality of attributes to a blocked Bloom filter (BBF) of a plurality of blocked Bloom filters, and map each attribute of the plurality of attributes to a block of the blocked Bloom filter.

The details of one or more implementations are set forth in the accompanying drawings and the description below. Other features will be apparent from the description and drawings, and from the claims.

DETAILED DESCRIPTION

Figure 1:
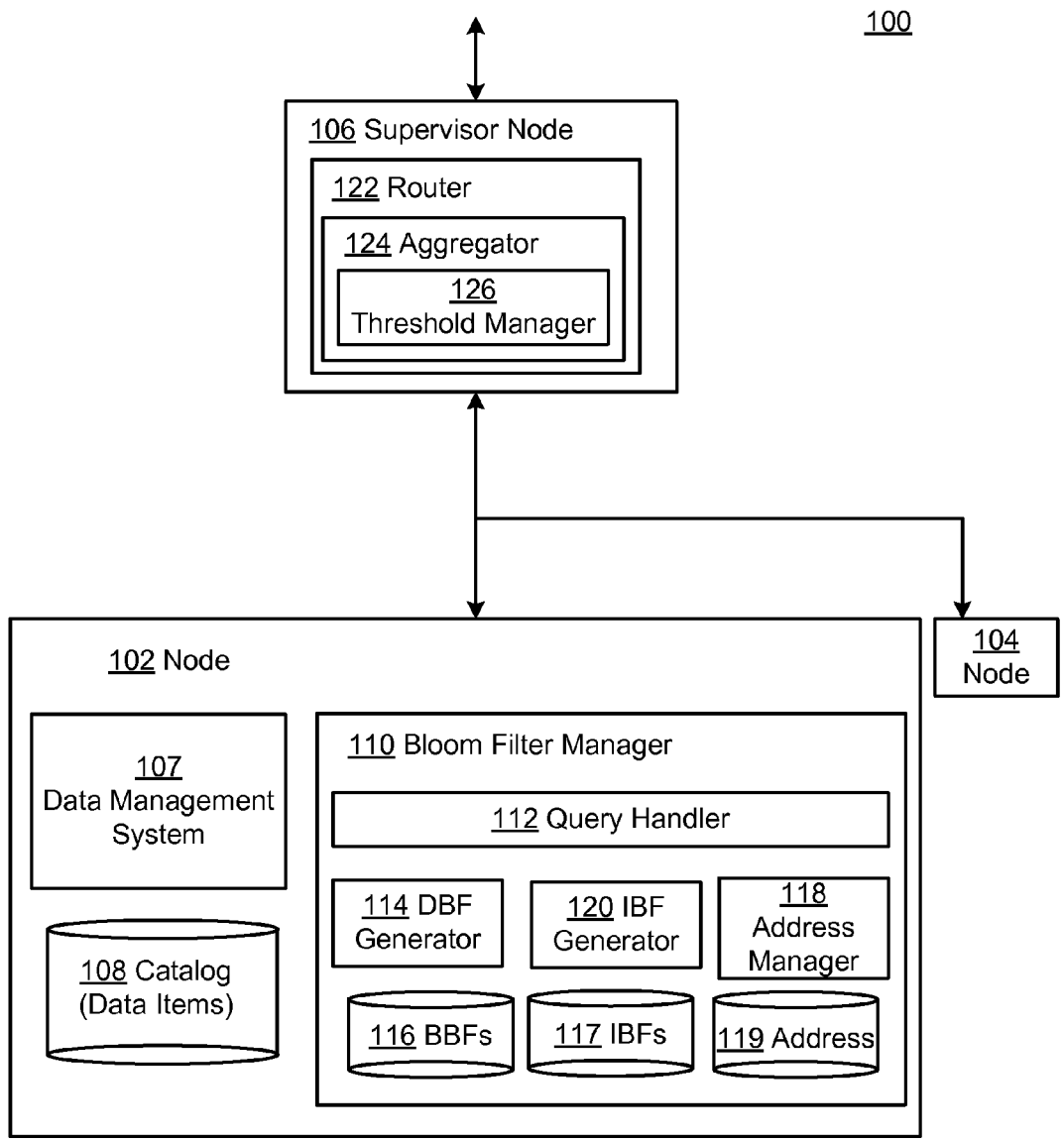
FIG. 1 is a block diagram of a system using blocked Bloom filters to support network communications.

FIG. 1 is a block diagram of a system 100 using blocked Bloom filters to support network communications. In particular, as described in detail herein, system 100 may utilize such blocked Bloom filters to enable attribute-specific queries, in a manner which is dynamic, flexible, and designed to optimize network communications and the use of network resources.

In the example of FIG. 1, and in many of the examples that follow, the use of such blocked Bloom filters is described in the context of a peer-to-peer (PTP) network, in which data is stored at each of a plurality of network nodes, illustrated in the example of FIG. 1 as including nodes 102, 104, and 106. Of course, in practice, the system 100 may include a large number of such nodes, although the example of FIG. 1 illustrates only the three nodes 102-106, for the sake of clarity and conciseness. Of course, the various techniques described herein also may be implemented in various other network scenarios, as it would be apparent to one of skill in the art.

In the example of FIG. 1, however, as just referenced, it is assumed that the nodes 102-106 are part of a larger peer-to-peer network. For example, such a peer-to-peer network may include at least some nodes which include, or are in communications with, one or more sensor devices. In such scenarios, the associated nodes may collect sensor data received from the various sensors, and then make the resulting data available over the peer-to-peer network. Of course, in these and other example scenarios, such data may be populated using techniques other than the collection of sensor data just described, such as, e.g., the use of network monitors configured to collect data relevant to the network and/or to the users thereof.

Thus, the node 102 is illustrated as including a data management system 107 which may be configured to collect, update, maintain, and otherwise manage a catalog 108 of data items collected by the node 102. For example, the catalog 108 may include various data items of a dataset collected using associated sensors (not illustrated in FIG. 1), as just described. Regardless of a manner in which the data items are obtained, the data management system 107 may be configured to store the collected data items in conjunction with included or associated attributes and associated attribute values.

In practice, the data items of the catalog 108 may include specific associated attributes and associated values thereof. For example, where each data item represents a specific physical location, associated attributes may include physical characteristics of the specific location, such as temperature, pressure, street address, or latitude/longitude. In other example implementations, the data items of the catalog 108 may correspond to specific customer records, so that associated attributes may include a street address, phone number, and associated purchase records. Of course, these are merely examples, and the catalog 108 may be understood to be utilized to store virtually any appropriate or desired data.

As described herein, users of the nodes 104, 106, or various other network nodes (not pictured in FIG. 1) may wish to retrieve some or all of a specific data item from the catalog 108 of the node 102. More generally, in the examples just described, the nodes 102-106 may be part of a network of a large number of such nodes, so that a user may wish to obtain desired data, without knowing specifically where (i.e., at which node) the desired data is collected.

Consequently, as referenced above, a Bloom filter manager 110 may be utilized to construct Bloom filter data structures representing the data items of the catalog 108. Thus, such Bloom filter data structures may be understood to support membership queries against the catalog 108, with minimal requirements for transmission/storage of the Bloom filter data structures.

Consequently, a query handler 112 may be configured to receive, or become aware of, queries from one or more nodes of the system 100 and potentially related to one or more data items of the catalog 108. As referenced above, and described in detail herein, the query handler 112 may be configured to utilize corresponding Bloom filter data structures to test for a presence (or absence) of the desired data item from the catalog 108. In this regard, as may be appreciated from the following description, although the query handler 112 is illustrated as being co-located with the catalog 108, some or all of one or both of the query handler 112 and the catalog 108 may be deployed at separate, different nodes. In particular, as described herein, blocked Bloom filter data structures may be transmitted to nodes which might wish to execute queries against the catalog 108, so that such queries may initially be executed against the local Bloom filter data structure, before the query is transmitted across the network for execution against the catalog 108 itself.

Accordingly, a blocked Bloom filter (BBF) generator 114 may be configured to represent content of the catalog 108 on an attribute-specific basis, in which each individual data item is represented within a particular blocked Bloom filter of a plurality of available blocked Bloom filters (BBFs) 116, and where each individual attribute of a given data item is represented in a particular block of the blocked Bloom filter representing the corresponding data item.

Thus, in a simplified example, the BBFs 116 might include two blocked Bloom filters, each of which may thus be used to represent half of the available data items within the catalog 108. Then, for each of the data items represented in a particular one of the two available BBFs 116, each included attribute may be represented using a corresponding, individual block of the larger blocked Bloom filter.

Thus, each block of each BBF 116 may be understood to represent an individual Bloom filter per attribute of a corresponding data item of the catalog 108. Moreover, as just described, all attributes of a particular data item may be mapped to corresponding blocks of a single, particular BBF of the available BBFs 116. Therefore, in order to ensure the association of all attributes of a particular data item with that particular data item (i.e., to avoid confusing attributes of a first data item as belonging with attributes of a second data item), an integrity Bloom filter (IBF) generator 120 may be configured to generate item-specific integrity Bloom filters 117, which effectively link or otherwise associates all attributes of a particular data item with that particular data item within a particular blocked Bloom filter.

Further in the example of FIG. 1, an address manager 118 may be configured to associate each data item of the catalog 108 with a corresponding BBF of the available BBFs 116. That is, for example, inclusion of a new data item within the catalog 108 may cause the address manager 118 to assign the new data item to a first one of two available BBFs 116. Then, at a later time, e.g., when a query related to the new data item is received by way of the query handler 112, the address manager 118 may be configured to determine again that the new data item is associated with the first one of the two available BBFs 116. Related address data may be stored in address database 119, as shown.

Specific example data structures for the BBFs 116, IBFs 117, and addresses 119, as well as associated functionalities of the BBF generator 114, the address manager 118, and the IBF generator 120, are described in detail below, e.g., with respect to FIGS. 3 and 4. In general, however, it may be appreciated that the Bloom filter manager 110 of FIG. 1 enables a fast, efficient, and flexible sharing of data between and among the various nodes 102-106 of a peer-to-peer network.

In particular, for example, it may be appreciated that the Bloom filter manager 110 does not require a definition of a total Bloom filter size at a time of configuration of a Bloom filter manager 110. In other words, as new data items are added to the catalog 108, the BBFs 116 may correspondingly be expanded, simply by adding new blocked Bloom filters. Further, as described in more detail below, only those blocked Bloom filters of the BBFs 116 which are thought to be necessary or helpful for responding to particular types of queries from particular nodes need to be propagated to such corresponding nodes, rather than propagating a single Bloom filter for the entirety of the catalog 108.

For example, in a specific example (described in more detail below with respect to FIGS. 6A, 6B and 7), it may occur that the nodes 102, 104 are child nodes of a parent or supervisor node 106. In such network configurations, efficiencies may be gained by aggregating transmission and storage responsibilities at the supervisor node 106 for its corresponding child nodes 102, 104.

In particular, as shown, a router 122 may be configured to transmit and receive communications from various other nodes of the relevant network, so that the supervisor node 106 effectively serves as a gateway or point of contact for its child nodes 102, 104. In this context, an aggregator 124 may be configured to aggregate some or all of the BBFs 116 of the node 102, along with corresponding BBFs of the node 104 (not specifically illustrated in the example of FIG. 1). As just described, however, the supervisor node 106 may not be required to aggregate all of the available BBFs of the nodes 102, 104. Rather, only those BBFs thought to be useful or productive in handling queries received via the supervisor node 106 may need to be aggregated by the aggregator 124.

As referenced above, addition of new data items of the catalog 108 of node 102 (and corresponding addition of new data items to a catalog of the node 104, not explicitly illustrated) may result in corresponding increases to the number of available BBFs at each node. Therefore, over time, the aggregator 124 may correspondingly aggregate an increasing total BBFs from each of its child nodes.

Figure 6A:
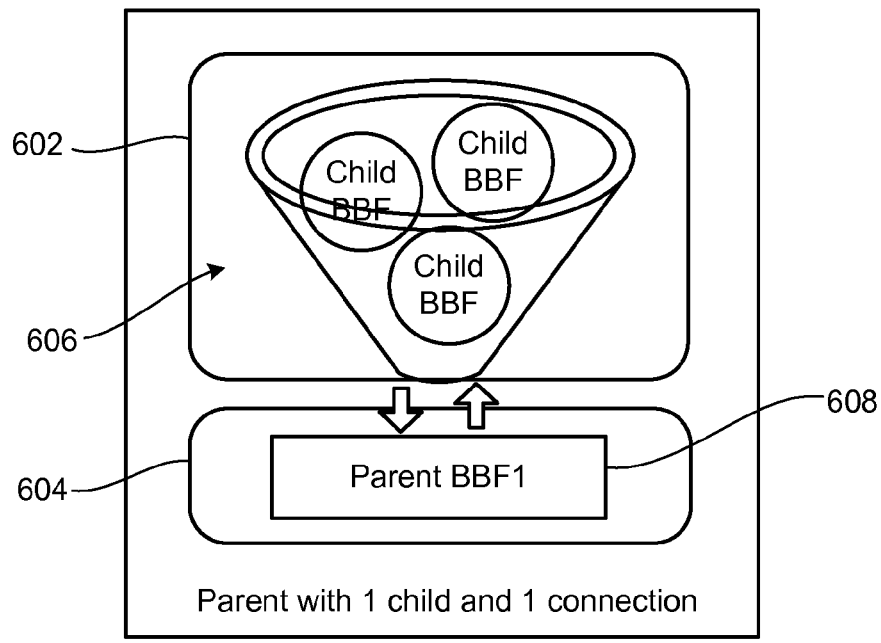
FIGS. 6A and 6B are block diagrams illustrating techniques for using the blocked Bloom filters of FIG. 1 in a hierarchal node structure.

As described in detail below with respect to FIGS. 6A, 6B, 7, inclusion of an excessive number of BBFs from a particular child node by the aggregator 124 may lead to inefficient or non-productive communications between the various nodes of the network. In particular, for example, aggregation of multiple child BBFs into an aggregated BBF at the supervisor node 106 may lead to unacceptably high false positive results for queries received via the supervisor node 106.

Consequently, a threshold manager 126 may be associated with the aggregator 124, and may be configured to define a threshold with respect to a total number and/or size of child BBFs of one or more child nodes by the aggregator 124. Consequently, the aggregator 124 may enable the router 122 of the supervisor node 106 to implement a scalable, hierarchal Bloom filter structure, which is useful in the type of hierarchal network configuration described and illustrated with respect to FIG. 1, while maintaining high interaction rates and low false positive rates with respect to the various child BBFs of the child nodes 102, 104, as well as aggregated versions thereof at the aggregator 124.

Thus, FIG. 1 may be understood to represent a simplified, and not exhaustive example implementation of the system 100. Consequently, not all aspects of the system 100 should be understood or inferred to be represented by the simplified example of FIG. 1. For example, as referenced above, the various components 107, 108, 110 illustrated in conjunction with the node 102 may be understood to be correspondingly implemented at the node 104, supervisor node 106, and any or all other nodes of the relevant network.

Somewhat similarly, although the various components of FIG. 1 are illustrated as separate functional blocks, it may be appreciated that many other configurations of the system 100 may be implemented. For example, any single component of the system 100 may be implemented using two or more components, while, conversely, any two or more components may be implemented using a single, combined component. For example, although illustrated separately in FIG. 1 for the sake of explanation, the BBFs 116 and the IBFs 117 may actually be combined for storage within corresponding combined data structures (examples of which are provided below with respect to FIG. 4).

Figure 2:
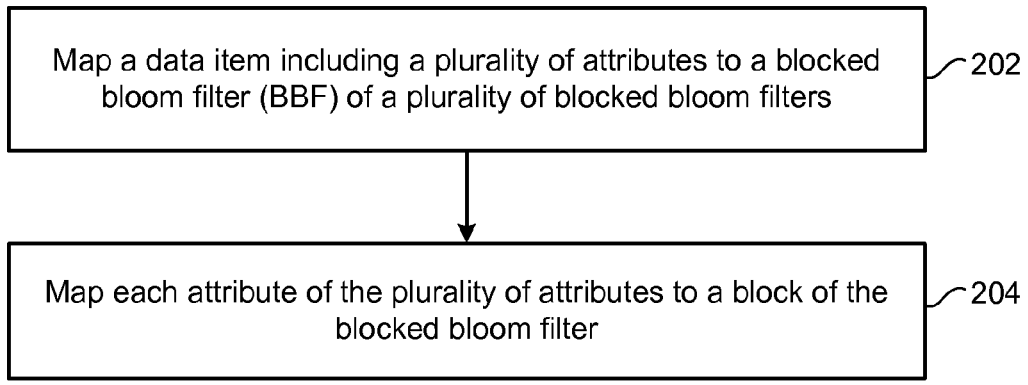
FIG. 2 is a flowchart illustrating example operations of the system of FIG. 1.

FIG. 2 is a flowchart 200 illustrating example operations of the system 100 of FIG. 1. In the example of FIG. 2, operations 202, 204 are illustrated as separate, sequential operations. However, it may be appreciated that the operations of the flowchart 200 may include additional or alternative operations, not specifically illustrated in the example of FIG. 2, and that any two or more such operations may be implemented in a partially or completely overlapping or parallel manner, and/or in a nested, iterative, or looped manner.

In the example of FIG. 2, a data item including a plurality of attributes may be mapped to a blocked Bloom filter (BBF) of a plurality of blocked Bloom filters (202). For example, a data item of a catalog 108 may be mapped to a first BBF of a plurality of available BBFs 116. As referenced above, and as described in more detail below, the address manager 118 may be configured to select the particular BBF of the available BBFs 116 for association with the particular data item.

Each attribute of the plurality of attributes may be mapped to a block of the blocked Bloom filter (204). For example, the BBF generator 114 may generate an individual Bloom filter for each attribute of the plurality of attributes for the data item in question, where, as described, the resulting Bloom filter may constitute an individual block of the particular blocked Bloom filter of the BBF selected as being associated with the corresponding data item in question.

Figure 3:
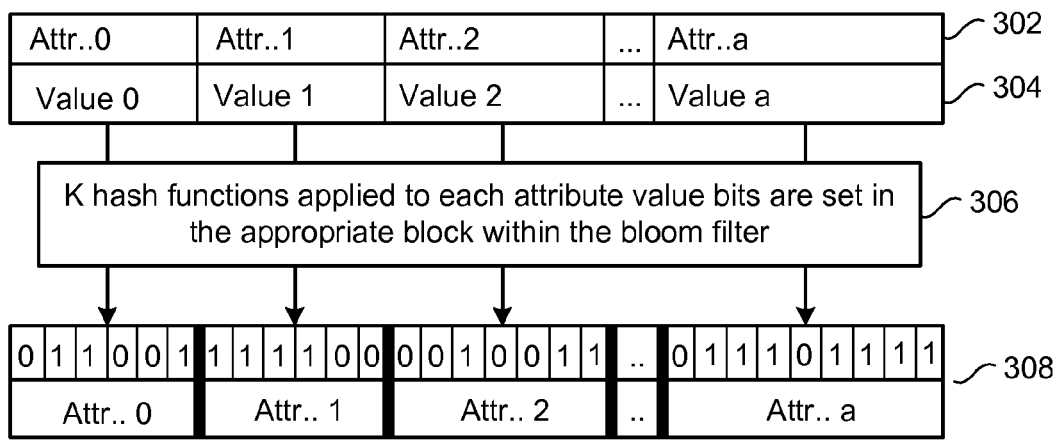
FIG. 3 is an illustration of a blocked Bloom filter utilized in the example of the system of FIG. 1.

FIG. 3 is a block diagram illustrating techniques for updating a blocked Bloom filter in the system 100 of FIG. 1. Specifically, as shown, a plurality of attributes 302 associated with corresponding values 304 may be defined in conjunction with a corresponding data item of the catalog 108 of FIG. 1. Then, a number "K" of hash functions 306 (which may include, for example, virtually any hash function used in conventional Bloom filters, or other hash functions) may be applied to each of the attribute values 304. Consequently, corresponding bits are set within the appropriate, associated block of a blocked Bloom filter 308.

In a specific example, as shown, attribute 0 having value 0 may be mapped using the K hash functions to thereby set a corresponding bit array as "011001" within a Bloom filter defining a block for attribute 0 within the plurality of blocks of the blocked Bloom filter 308. Similarly, the K hash functions may be used to map the value 1 to the illustrated bit array of the Bloom filter block of attribute 1, and similarly for the remaining attributes and associated values.

Thus, the blocks corresponding to attributes "0 . . . a" may be sized appropriately, depending on a number of distinct entries for each attribute. That is, unlike conventional Bloom filters, in which a size of the Bloom filter must be defined at a design time for an entire dataset, and cannot be changed or updated without pausing to recreate a new Bloom filter, the example structure of FIG. 3 not only utilizes Bloom filters at the attribute level (thereby enabling attributes specific queries), but also enables individual customization of Bloom filter sizes for each corresponding attribute and associated value. Moreover, as referenced above, as a size of the catalog 108 grows, the BBFs 116 may be correspondingly increased, simply by adding additional BBFs to the existing BBFs 116.

In various related implementations, not specifically illustrated in the example of FIG. 3, each block of the blocked Bloom filter 308 may be implemented using a counting Bloom filter, in which, instead of a single bit per position and the array, multiple bits (e.g., four bits) may be used. As described in more detail below, the use of such counting Bloom filters enables the deletion of attribute values from within the corresponding data item of the catalog 108, and associated deletion update of the corresponding block of the relevant blocked Bloom filter.

Figure 4:
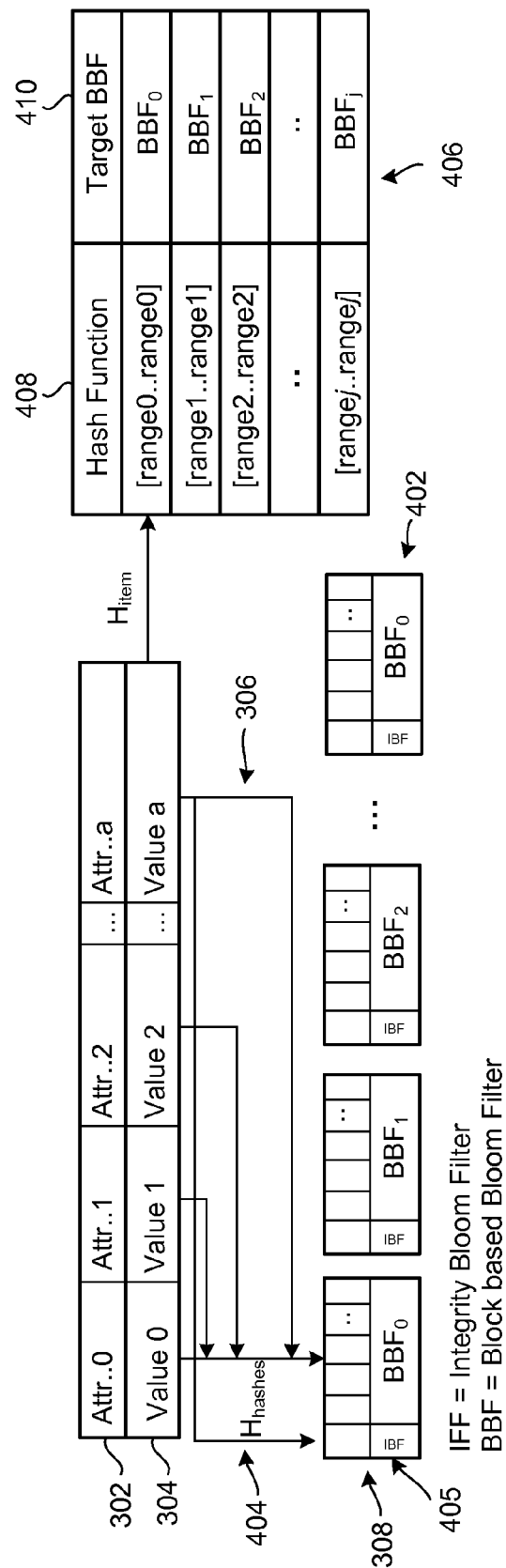
FIG. 4 is an illustration of an addressing scheme used to identify blocked Bloom filters of the system of FIG. 1.

FIG. 4 is a diagram illustrating the use of integrity Bloom filters and hash-based addressing schemes for the example of FIG. 3. As shown in FIG. 4, the blocked Bloom filter 308 of FIG. 3 may be merely one of a plurality of blocked Bloom filters 402. Then, in addition to the K hash functions 306 and resulting hashed values stored in the blocked Bloom filter 308, at least one additional hash function 404 may be implemented, which is used to execute a hash of all the hashed values resulting from the application of the K hash functions 306. Results may then be stored within a separate counting Bloom filter 405 representing an integrity Bloom filter of the IBFs 117 of FIG. 1.

As referenced above, the IBF 405 ensures that all attributes associated with a particular data item may be identified as such in the context of the corresponding blocked Bloom filter 308. In so doing, the IBF 405 may prevent a false positive which might otherwise occur due to a coincidental, apparent match which might result from overlapping attributes/values of two or more data items within the blocked Bloom filter 308. Moreover, the IBF 405 may thus be used as a preliminary check before performing an item query, since a check on the IBF 405 which returns false ensures that no individual data item exists which includes all of the desired attribute values specified by the query in question.

As further illustrated in the example of FIG. 4, since a plurality of blocked Bloom filters 402 are utilized, the address manager 118 of FIG. 1 may utilize an address hash table 406 in order to associate particular data items of the catalog 108 with individual ones of the blocked Bloom filters 402, e.g., the blocked Bloom filter 308. Specifically, as shown, the address hash table 406 (corresponding to the addresses 119 in the example of FIG. 1.) may include a plurality of hash functions 408 associated with ranges of values which correspond to individual target BBFs 410, as shown.

Thus, using the hash function 408, e.g., a random hash function, the various data items may be evenly distributed over the available BBFs 402, while maintaining 0(1) time for insert, query, and delete operations. Moreover, since the hash function 408 maps exactly to a specific BBF of the BBFs 402, only the single, selected BBF is required for processing, thereby conserving computational resources.

In the example of FIG. 4, it is assumed that each BBF of the BBFs 402 will hold a comparable number of data items, and can be updated independently over the network. Consequently, highly efficient updates may be performed on an as needed basis over the network, and, in so doing, only the relevant BBFs need actually be transmitted over the network, thereby conserving network resources.

Figure 5:
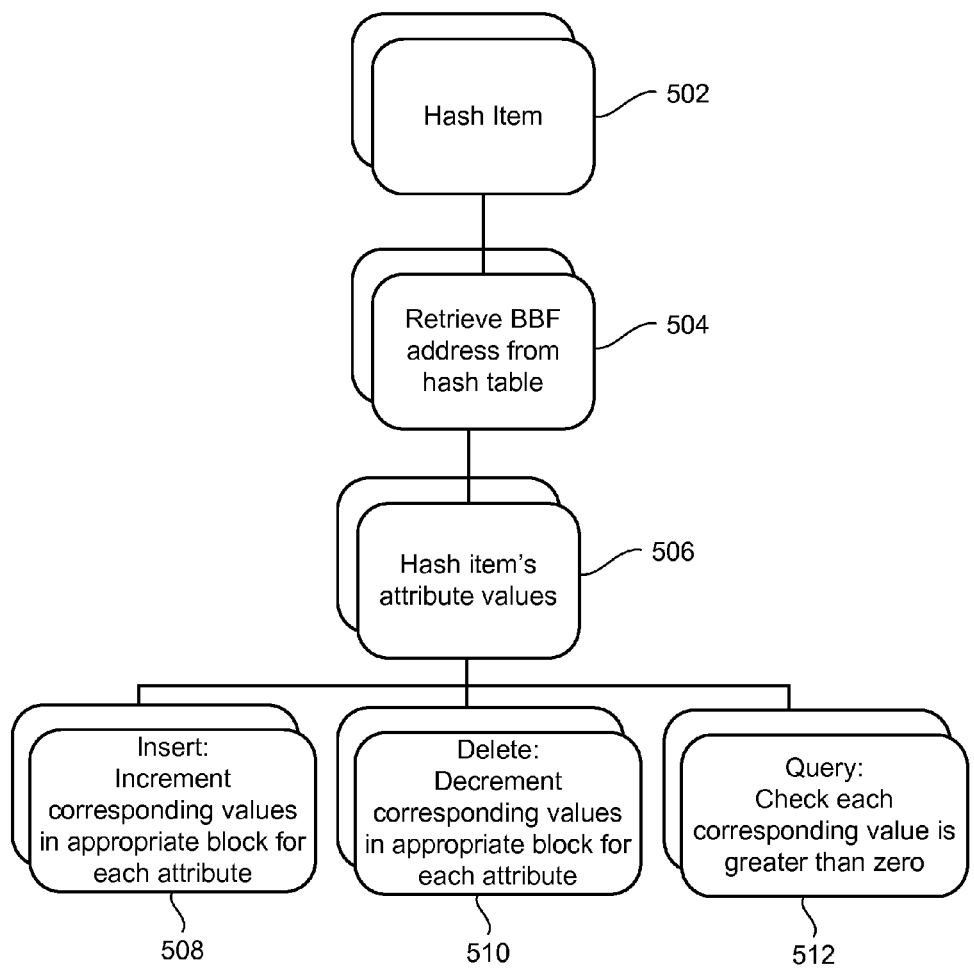
FIG. 5 is a flowchart illustrating example operations of the system of FIG. 1 using the blocked Bloom filter of FIG. 3 and the addressing scheme of FIG. 4, respectively.

FIG. 5 is a flowchart illustrating BBF processing techniques for the system 100 of FIG. 1, using the data structures of FIGS. 3 and 4. Specifically, FIG. 5 illustrates related techniques for inserting, deleting, or querying particular data items of the catalog 108.

In the example of FIG. 5, the data item may be hashed (502), e.g., using the hash function 408 of FIG. 4. Accordingly, the target BBF address may be retrieved from the hash table 406 (504). For example, the address manager 118 of FIG. 1 may perform the operations 502, 504 for the item in question, to thereby identify, e.g., the BBF 308 from among the available BBFs 402 of FIG. 4.

The data item attribute values may thereafter be hashed (506). Then, in an insert operation (508), the corresponding attribute values desired to be inserted may be incremented and the corresponding Bloom filter block for each attribute. Similarly, in a delete operation (510), corresponding attribute values may be decremented in the appropriate Bloom filter block for each attribute. Finally in the example of FIG. 5, in a query operation (512), the presence of a specified attribute, or the data item as a whole, may be checked by checking whether each corresponding value is greater than 0 (and checking whether all relevant attribute values correspond to the original data item, using the relevant integrity Bloom filter).

More detailed and specific examples of insert/query/delete operations are provided below, e.g., with respect to FIGS. 8-12, however, it may be appreciated from FIGS. 3-5 that use of the data structures described therein, including the address hash table 406, enables direct access to a required BBF, resulting in a false positive ratio which is consistent with that of traditional Bloom filters.

In summary, FIGS. 1-5 describe a blocked base approach to Bloom filters in the context of network communications, in which blocked Bloom filters are split into sections or blocks of continuous bits, with one block for each attribute within an item. Thus, instead of simply creating a general hash for the entire data item, a hash is created for each attribute within the data item. The resulting attribute hash may be added to the respective blocks within the corresponding BBF, thereby allowing the information within a data item to be maintained, and allowing for queries for membership of individual attributes.

Since each such block may be understood to represent a separate Bloom filter per attribute, and since the number of bits needed to maintain a certain level of false positive probability within a Bloom filter increases as the number of distinct entries increases, then a number of bits used to represent each attribute may vary (since the number of unique values in each attribute typically differ). Consequently, attributes with higher levels of variance will generally have larger blocks than those of lesser variance, as illustrated in the example of FIG. 3. Then, given a total expected number of unique values for each attribute, appropriate block sizes may be calculated in the same way as calculating the size of a traditional Bloom filter.

As also described above with respect to FIGS. 1-5, the integrity of a data item added to a BBF may be maintained using the integrity Bloom filters, e.g., IBF 117 of FIG. 1, or IBF 405 of FIG. 4. As described, such IBFs address the fact that although information contained within each data item is preserved in its entirety within a corresponding blocked Bloom filter, each attribute value is added to the corresponding BBF in an independent fashion from other attribute values of the same data item. Consequently, in the absence of the IBFs, a query that returns true for a membership query of multiple attribute values may do so because multiple data items together have all of the query attribute values, even though no single individual data item contains all of the desired information.

To avoid such false positives, as described, the integrity Bloom filter for a corresponding data item may be stored to serve as fingerprint for each item added to a given BBF. As described with respect to FIG. 4, such a fingerprint may be created by taking a hash of all the hashes created when the data item's attribute values are added to the BBF in question.

Consequently, as illustrated with respect to FIG. 4, each BBF will maintain its own integrity Bloom filter, to use when transmitting updates to other nodes. Further, when performing a membership query for a data item, the integrity Bloom filter may be checked as a preliminary matter, because any negative result implies a certainty that the data item does not exist, and removes the need to check each Bloom filter block necessitated by a return of a positive result.

Thus, the described BBF structure allows data items to be stored within the catalog 108 in a manner that preserves the possibility of querying over individual attribute values, or ranges of attribute values. Moreover, the described structure is flexible. For example, the described structure anticipates that updates may be made to the catalog 108, new data items may be added, and existing data items may be removed from any given node over a period of time.

As referenced above, removal of element of data items from within the catalog 108 may be accomplished using a counting Bloom filter structure for the BBFs 116, in which, e.g., four bit values are used in a vector instead of a single bit for a corresponding hash of an attribute value. Thus, when an item is added to such a counting Bloom filter, the values are incremented rather than being simply set to one, and a subsequent query checks for non-zero values to test for set membership. Therefore, to delete an item, as described in more detail below with respect to FIG. 9, corresponding indexes in the Bloom filter may simply be decremented, without destroying the integrity of the blocked Bloom filter. Similarly, the IBFs 117 may be constructed using counting Bloom filters, with the same advantages and features just described.

With regard to the potential increase in membership of data items of the catalog 108, it may be appreciated from the above description, and is described in more detail below with respect to FIG. 8, that additional BBFs may be added on an as-needed basis, such as when an existing BBF begins to exceed an acceptable false positive rate, or when an operator of the system 100 wishes to add an attribute category to a class of data items. Thus, by using multiple BBFs, the number of items per Bloom filter may be decreased relative to conventional solutions, thereby reducing the number of bits needed per Bloom filter and reducing the risk of high false positives due to excess in set memberships. As described with respect to FIG. 4, the use of the hash table 406 enables the use of such multiple BBFs, and identifies a location of a new or existing data item with respect thereto.

Thus, the above description of FIGS. 1-5 provide example explanations and examples of techniques for creating, storing, and maintaining information within, or with respect to, a single node, e.g., the node 102. As referenced above, additional, more detailed examples are also provided in this regard below with respect to FIGS. 8-12. As also described with respect to FIG. 1, however, a network utilizing the features and functions of FIGS. 1-5 may be arranged in a hierarchal fashion, so that the supervisor node 106 is in communication with multiple child nodes 102, 104. Consequently, FIGS. 6A, 6B, 7 provide additional explanation and examples of techniques for creating, storing, querying, and otherwise maintaining network information with respect to such inter-node communications.

More specifically, FIG. 1 references the ability of each node 102, 104 to store its own catalog, (e.g., the catalog 108), and each node is configured to communicate this information through the supervisor node 106 within the relevant local area. As illustrated and described, the supervisor node 106 may be configured to aggregate the received information from the child nodes 102, 104, to facilitate execution of global queries. This necessitates that the catalogs be communicated across the network, and such communication may be required to happen relatively frequently, e.g., due to nodes continually updating their catalogs. Moreover, the hierarchal structure may extend over relatively large areas, resulting in network trees that may be many levels deep.

Using the features and functions of FIGS. 1-5, the size of updates between nodes may be decreased, thereby conserving network resources. Specifically, the use of multiple BBFs 116 allow relatively smaller updates, since each individual BBF represents only a fraction of the catalog 108. As a result, for example, when an update (e.g., an insert operation), occurs, only the affected portion of the dataset (i.e., the affected BBF) needs to be communicated to the interested nodes.

Further, to the extent that there may be many levels within the hierarchal structure, progress into higher level nodes implies that each level/node store relatively larger datasets, composed of the various catalogs of the associated lower level nodes. Such aggregation, as described above with respect to the aggregator 124, implies a risk of saturating the aggregated BBFs, thereby causing unacceptably high false positive rates.

As described with respect to FIG. 1, the threshold manager 126 may be configured to avoid such over-aggregation. In more specific examples, as shown in FIGS. 6A, 6B, 7, a method of BBF scaling based on connected child nodes may be implemented.

Specifically, each parent node may aggregate the BBFs of each child node into one local BBF, thereby allowing queries to remain associated with the correct child to which the information belongs. For example, FIG. 6A illustrates an example in which a node 602 communicates with a parent node 604, and a plurality of child BBFs 606 are aggregated into a parent BBF 608. Thus, FIG. 6A illustrates a parent node having a single child node and a single connection therewith.

Where the number of BBFs within a child node grows large, however, such aggregation into a single BBF risks exposing the possibility of unacceptably high false positive rates. Therefore, FIG. 6B illustrates the use of virtual connections created to facilitate nodes with a large number of BBFs.

Figure 6B:
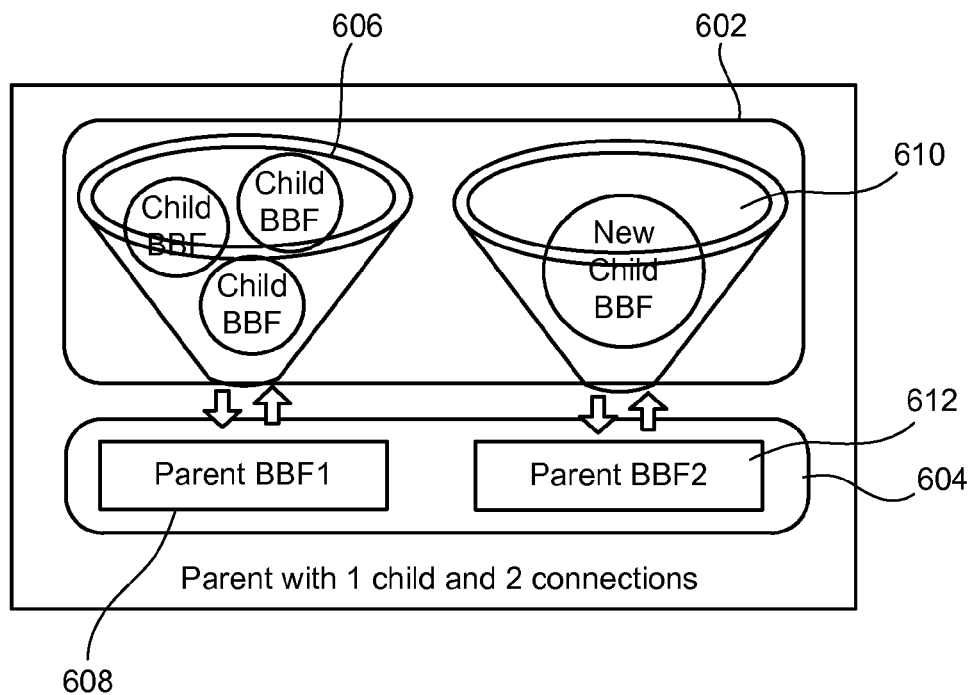

For example, FIG. 6B illustrates an example in which the parent node 604 is still associated with a single child node 602, and the parent BBF 608 is still connected to corresponding child BBFs 606. At the same time, as shown, a second connection may be established between a second parent BBF 612 and at least one new child BBF 610.

As described with respect to the threshold manager 126, a threshold may be set to govern a maximum number of BBFs that may be aggregated. That is, when this threshold is reached, the threshold manager 126 may establish a second (or greater) virtual connection with the associated child node. Then, the child node will communicate updates from the original BBFs up to the threshold using the first connection, while communicating updates from the post-threshold BBFs using the second virtual connection.

Figure 7:
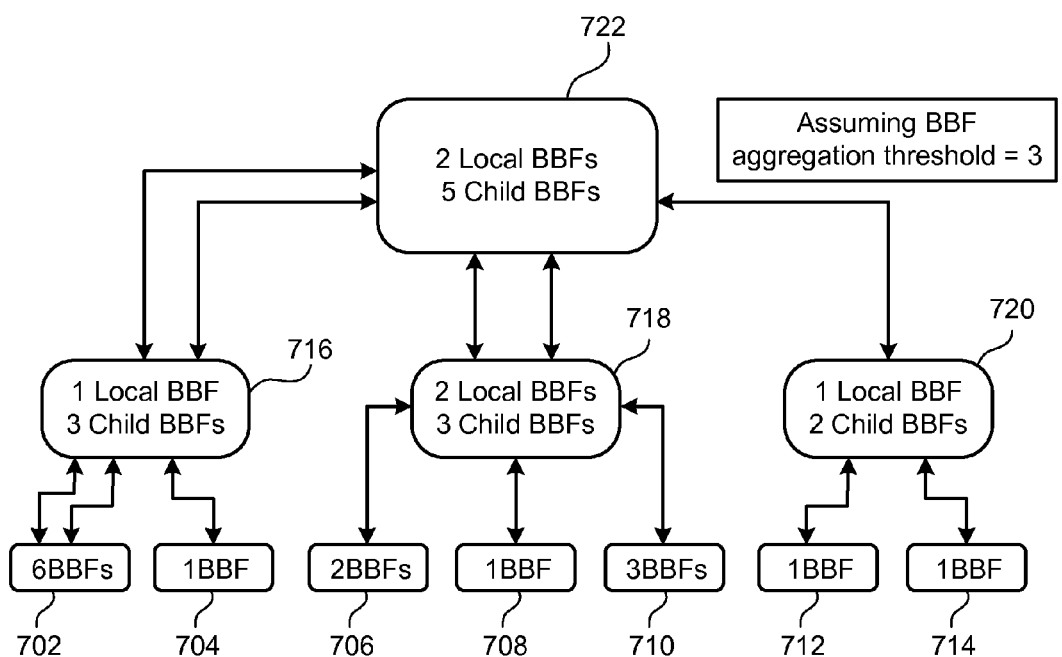
FIG. 7 is a block diagram of an example node hierarchy which may be implemented in the example of FIGS. 6A, 6B.

FIG. 7 illustrates a more extensive and detailed example of a hierarchal network structure, in which the BBF aggregation threshold is assumed to equal 3. In the example, as shown, a plurality of BBFs 702-714 are illustrated, which may be understood to exist at corresponding child nodes. Similarly, parent supervisor nodes 716-720 are illustrated as being connected to the various child nodes 702-714. Finally, a grandparent supervisor node 722 is illustrated as being connected to the parent supervisor nodes 716-720.

As shown, since the aggregation threshold is assumed to equal 3, the child BBFs 702, which includes 6 BBFs, establish two connections to the corresponding parent supervisor node 716. Meanwhile, remaining child nodes 704-714 each have 3 or fewer BBFS, and therefore each establish only a single connection with corresponding parent supervisor nodes 716-720. Similar comments apply to the connections between the parent supervisor nodes 716-720 and the grandparent supervisor nodes 722. That is, as shown, the parent supervisor node 716 includes 4 total BBFs, including a single local BBF and 3 child BBFs, and therefore establishes two connections with the grandparent supervisor node 722. Similar comments apply to the parent supervisor node 718, which includes 2 local BBFs and 3 child BBFs. Finally, the parent supervisor node 720 includes 3 total BBFs, including 1 local BBF and 2 child BBFs, and therefore maintains only a single connection with the grandparent supervisor node 722.

Thus, the system of FIGS. 1, 6A, 6B, and 7 demonstrate a system which enables dynamic scaling, as connections may be added and removed as the size of each child node changes over time. Further, in various implementations, multiple level hierarchies may be implemented, while maintaining an acceptable false positive level. The threshold may be derived, e.g., via experiments and analysis of past results, in order to achieve a good guideline value for the threshold.

As referenced above with respect to FIG. 5, FIGS. 8-12 are flowcharts illustrating more detailed example implementations of insert, delete, and query operations.

Figure 8:
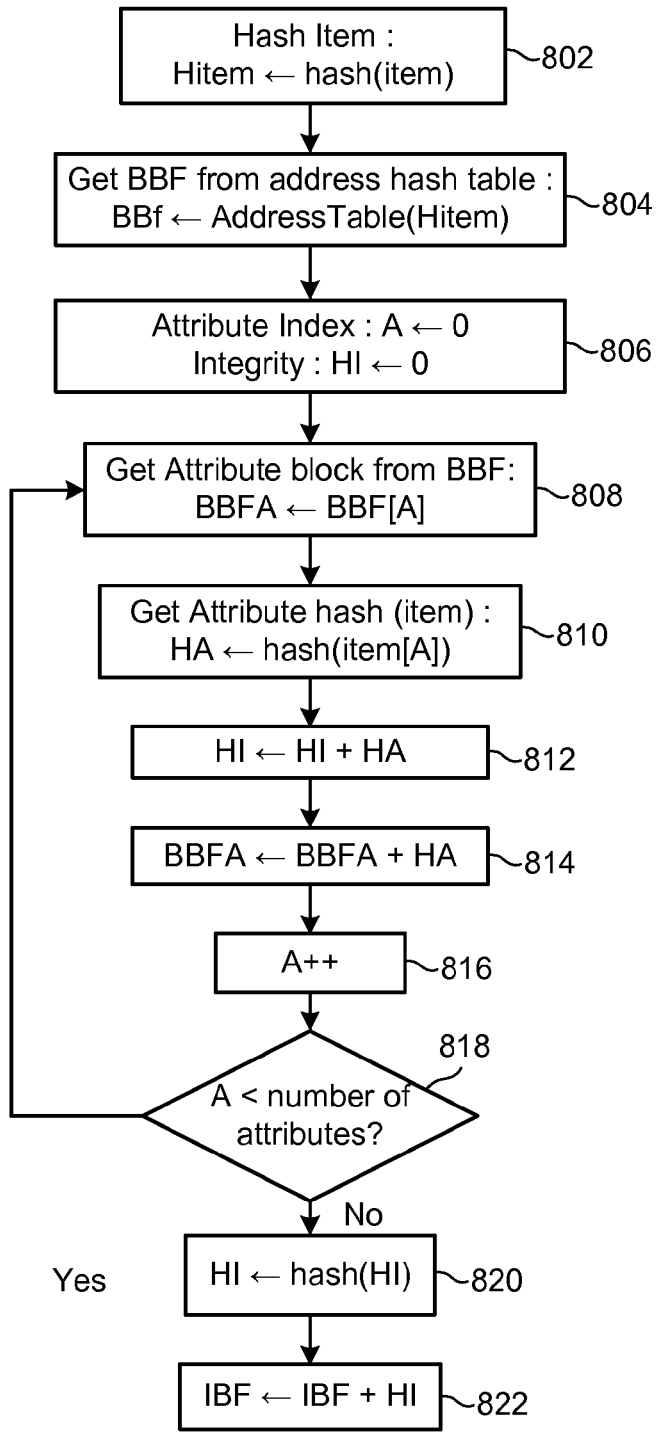
FIG. 8 is a flowchart illustrating an example insertion technique for updating a blocked Bloom filter of FIG. 1.

Specifically, FIG. 8 is a flowchart 800 illustrating a more detailed example of the insert operation 508 of FIG. 5. That is, FIG. 8 relates to scenarios in which, for example, a new data item has been added to the catalog 108 of FIG. 1, and the Bloom filter manager 110 is configured to update the BBFs 116 and the IBFs 117 accordingly.

Thus, in the example of FIG. 8, the data item to be inserted may initially be hashed to obtain a resulting hashed data item Hitem. Subsequently, the address table 406 of FIG. 4 may be consulted by the address manager 118, to thereby obtain the correct BBF for inclusion of the data item to be inserted (804).

In the example of FIG. 8, it is assumed that the data item to be inserted includes a plurality of attributes, so that a corresponding attribute index may be initialized at 0, while a corresponding integrity hash for the integrity Bloom filter to be formed for the data item is also initialized at 0 (806). Then, an iterative loop (808-818) may be executed over all of the included attributes and associated values. Specifically, as shown, a first attribute may be selected in conjunction with a corresponding attribute block of the BBF, where the attribute block is notated as BBFA (808). The corresponding attribute may be hashed, using the K hash function 306 of FIG. 3, to thereby obtain a hash attribute notated as HA (810).

The hash value for the integrity Bloom filter (notated as HI) may be updated to include the hashed attribute value by hashing the hashed attribute value together with the original hashed item (812). Somewhat similarly, the relevant block of the blocked Bloom filter (BBFA) may also be updated with the hash attribute value (814).

Subsequently, the attribute value may be incremented (816) and as long as the incremented value of the next attribute is less than the number of total attributes (818), than the iterative loop may continue with the selection of the next available attribute (808). If, however, the final attribute is reached (818), then the accumulated hashed value HI may be updated with an additional hash (820), where the additional hash represents a hashing technique for distinguishing between hash values that would otherwise potentially be too close to one another to reliably distinguish. For example, if the catalog 108 includes a dataset of customer addresses, many of the addresses may be very similar (e.g., from a certain geographic region), so that hashed values thereof also may be similar. However, by executing an additional hash (820), the resulting hash values may be more reliably distinguished.

Finally, the IBF for the data item to be inserted may be created (822). Specifically, as shown, the accumulated hash item value HI may be included as the associated integrity Bloom filter IBF.

Figure 9:
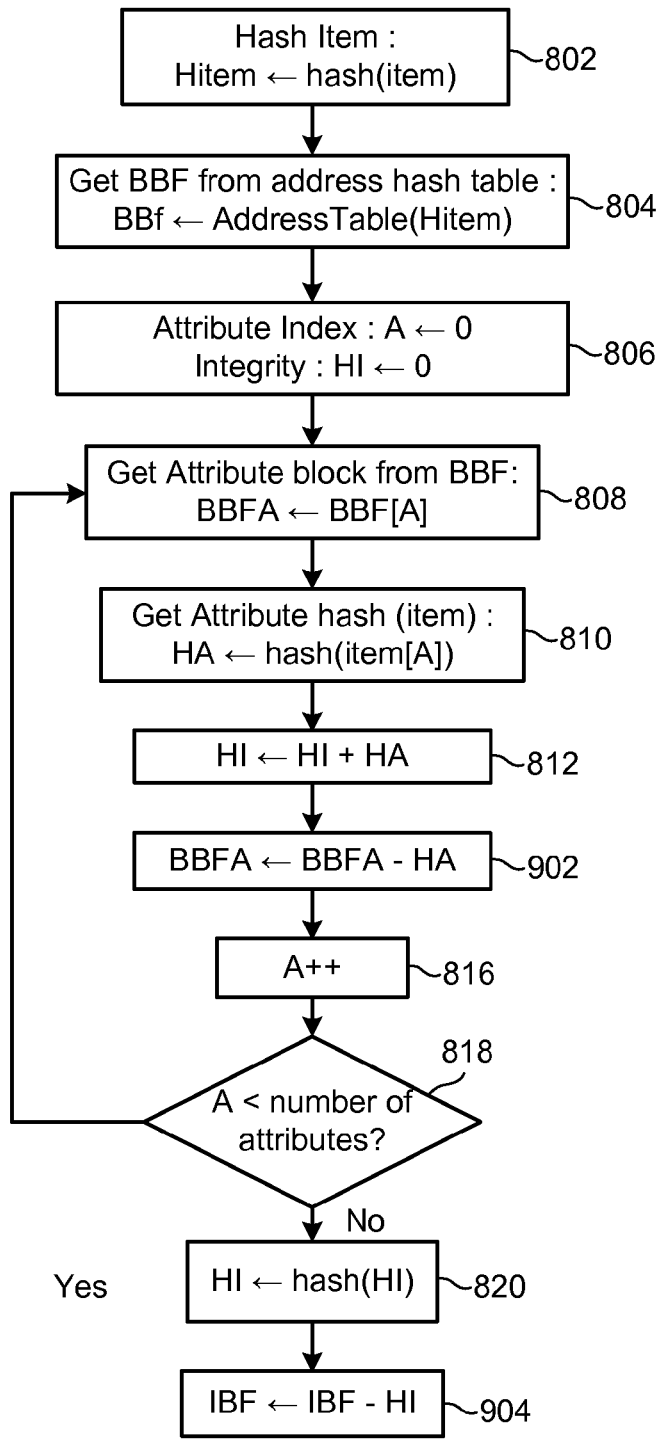
FIG. 9 is a flowchart illustrating example deletion techniques for updating the blocked Bloom filters of FIG. 1.

FIG. 9 is a flowchart 900 illustrating more detailed examples of the delete operations 510 of FIG. 5. Specifically, as illustrated, operations of the flowchart 900 are substantially similar to operations of the flowchart 800 in many respects, so that like operations are numbered alike within the two. However, as also shown, for deletion operations, each iterative loop over available attribute values and hashes thereof may include a decrementing of the BBFA (902), which, as referenced above, may be implemented as a counting Bloom filter to enable such decrementing in order to represent deletion of the data item from the catalog 108 (or more specifically in the example of FIG. 9, represent deletion of an attribute of the relevant data item).

Similarly, the IBF for the data item to be deleted may be decremented by the value of the aggregate hashes of the attribute values for the data item as a whole (904). As also referenced above, the decrementing of the integrity Bloom filter (IBF) in this manner may be enabled using the type of counting Bloom filter just referenced above.

Figure 10:
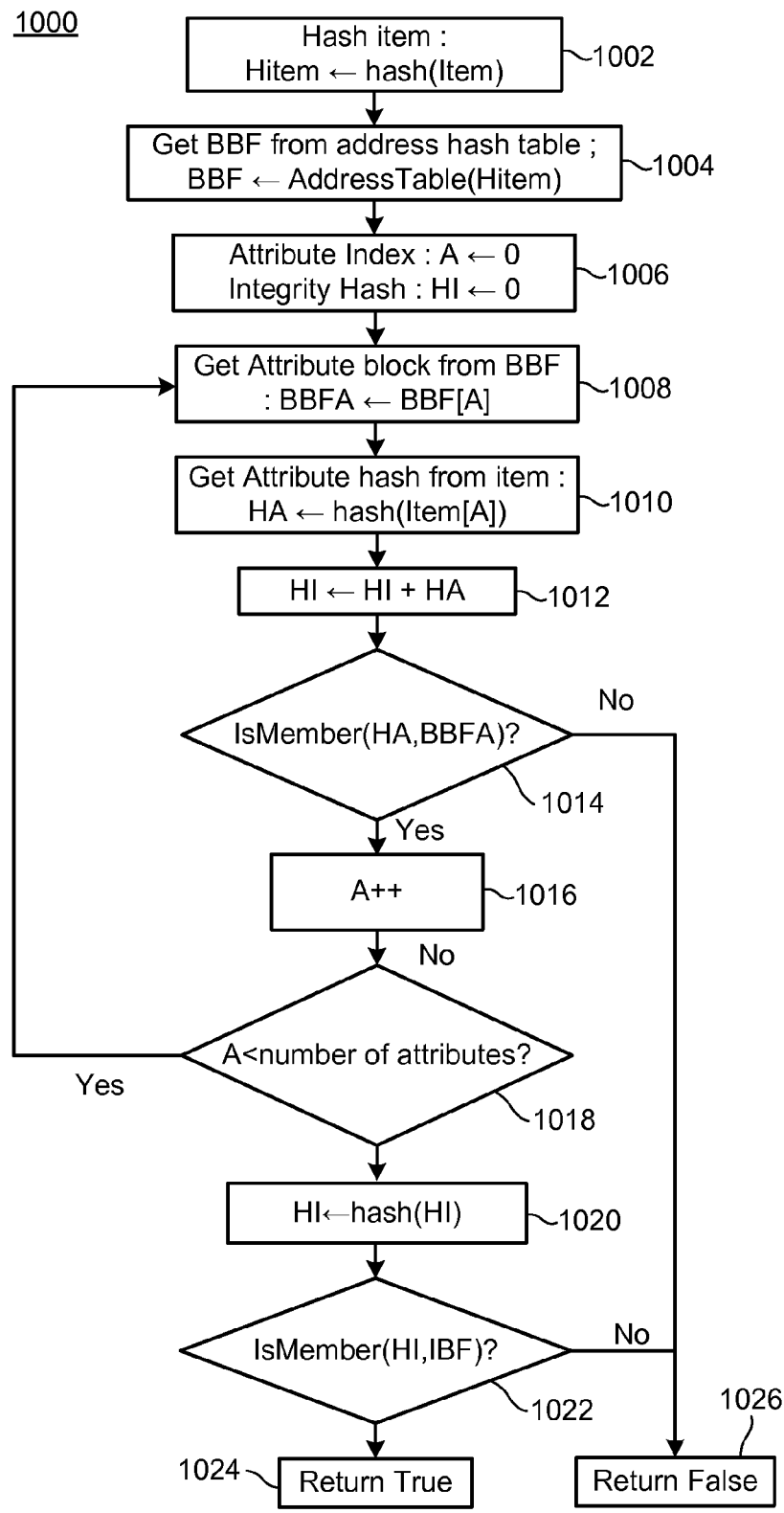
FIG. 10 is a flowchart illustrating example techniques for executing a query for a data item using the blocked Bloom filters of FIG. 1.

FIG. 10 is a flowchart 1000 illustrating a first type of the query operation 512 of FIG. 5. More specifically, the example of FIG. 10 illustrates an item query, i.e., a query in which the BBFs 116 of FIG. 1 are evaluated for inclusion of a specified item. Thus, in the example of FIG. 10, the specified item may be hashed to obtain a representative hash value (Hitem) (1002). Then, the correct BBF for the hashed data item may be obtained from the relevant address hash table (1004).

Subsequently, the query handler 112 may execute an iterative loop of operations 1008-1018, in order to check for the existence of each attribute value of the data item in question within the relevant blocked Bloom filter. Before so doing, an initialization operation (1006) may set initial values of 0 for the attribute number and associated integrity hash for the integrity Bloom filter.

Thus, the iterative loop may begin with retrieval of a first attribute block from the identified BBF (1008). The corresponding attribute hash may then be obtained (illustrated as "KA") (1010). In this way, the integrity hash HI may be updated using the just-obtained attribute hash HA (1012).

A membership check may be performed to determine whether the current attribute is in fact a member of the relevant blocked Bloom filter (1014). Specific techniques and examples for determining such membership are described below with respect to FIG. 12. However, it may generally be appreciated from the above description that some blocked Bloom filters may contain attributes and associated values which are not included in other blocked Bloom filters at the same node, since it is a feature and advantage of the blocked Bloom filters 116 of FIG. 1 that new blocked Bloom filters having additional attributes and associated values may be added to, and used in conjunction with, already-existing BBFs.

If the per attribute is not a member (1014), then the query handler 112 may return the value false, representing non-inclusion of the specified data item and the relevant blocked Bloom filter (1026). If, however, the current attribute is a member of the specified blocked Bloom filter for the attribute (1014), then the current attribute may be updated to a next attribute value (1016). As long as the incremented value for the subsequent attribute is less than a total number of attributes (1018), then the loop of operations 1008-1018 may continue. Otherwise, the integrity hash may be updated for the sake of clarity (1020), as described above with respect to operation 820 of FIG. 8. If the specified item is determined to be a member of the relevant integrity Bloom filter (1022), then a value of true may be returned (1024) to the requesting user. Otherwise, as shown, a value of false may be returned (1026).

Figure 11:
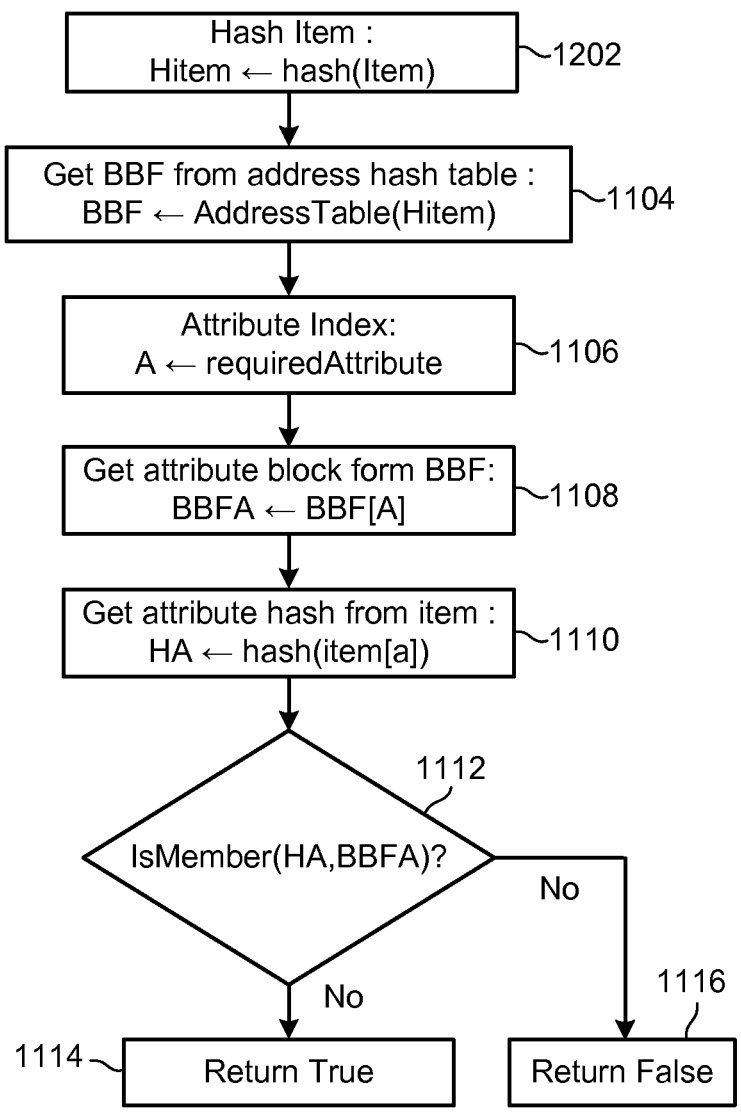
FIG. 11 is a flowchart illustrating query operations for performing an attribute-based query for attributes of a data item using the blocked Bloom filters of FIG. 1.

As referenced above, e.g., with respect to FIG. 1, the system 100 may be configured to provide attribute-specific queries, example operations of which are provided in the context of FIG. 11. In the example of FIG. 11, upon receipt of an attribute-specific query, the associated data item may be hashed (1102), as described above with respect to operation 1002. Also similarly, a relevant BBF may be retrieved from the address hash table (1104), as described above with respect to the operation 1004 of FIG. 10.

Then, an attribute index may be configured to store the relevant, required attribute (1106), and the relevant attribute block may be retrieved from the addressed BBF (1108). In this way, an attribute hash may be determined from the data item (1110). Then, as long as the attribute in question is a member of the identified blocked Bloom filter (1112), then the value of true may be returned (1114), and otherwise a value of false may be returned (1116). Thus, in contrast with the example of FIG. 10, in which a single, entire data item may be queried, the system 100 of FIG. 1, as illustrated by the example of FIG. 11, enables specific queries for defining attribute values or ranges of values.

Figure 12:
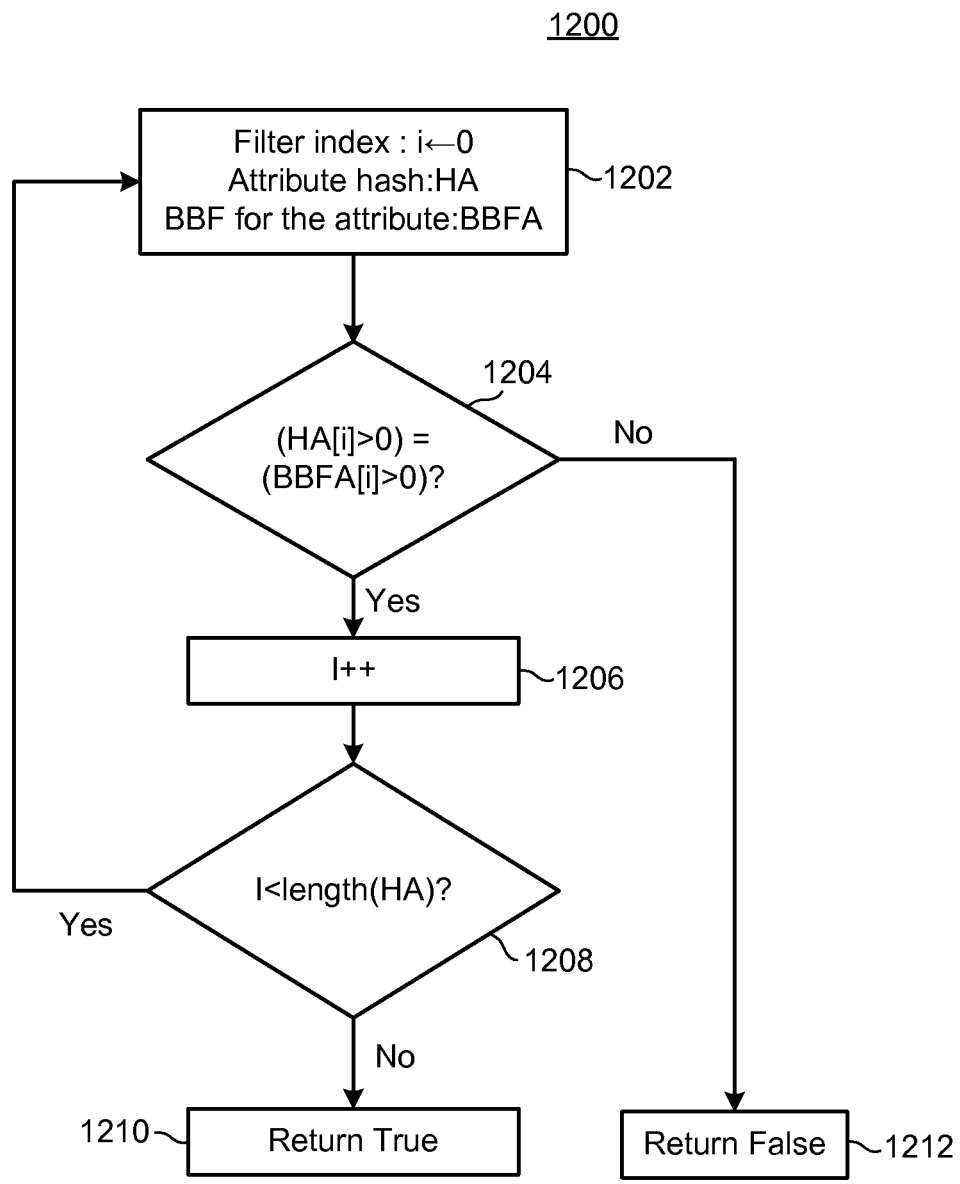
FIG. 12 is a flowchart illustrating techniques for testing for inclusion of an attribute within blocked Bloom filters of FIG. 1, in support of the querying operations of FIGS. 10, 11.

FIG. 12 is a flowchart 1200 illustrating additional details regarding the membership check operations 1014, 1112 of FIGS. 10, 11, respectively. Specifically, as shown, an initial value of 0 may set as an initialization value for a filter index used to increment specific attribute hash values. Further, as described above, the relevant BBF for the current attribute may be identified, which may be notated as BBFA (1202).

Then, as long as the attribute hash value and associated value from the BBFA are positive (1204), then the process may increment (1206), so that as long as a length of the attribute has not been reached (1208), the loop operations 1204-1208 may continue. Otherwise, if the attribute hash value and associated BBFA are not greater than 0 (1204), then the operation may return a false value (1212). Once the iterative loop of operations 1204-1208 determines that the attribute hash length has reached a final value, then a membership value of true may be returned (1210).

In addition to the above description of FIGS. 1-12, it may be appreciated that various other variations and optimizations of the system 100 may be implemented. For example, the system 100 may be configured to recognize a trade-off that may exist between being up-to-date in terms of knowledge of relevant remote BBFs and the level of network activity. That is, in order to work effectively, the system 100 may be configured to remain up-to-date, without allowing the relevant network to become saturated to do so.

Thus, in addition to the use of the multiple smaller BBFs described above, a risk of network overload may persist. To combat this possibility, a cushioning strategy may be implemented to allow for fewer updates, while still maintaining an effective catalog by ensuring that information that is needed remains present.

In order to accomplish this result, for example, the insertion of additions may be prioritized, thereby allowing such additions to be immediately propagated through the system 100 and ensuring that false negatives do not occur. Additionally, or alternatively, communications of deletions may be reduced in order to reduce traffic, whereupon deletions may then be propagated when a certain threshold of changes reach, or, e.g., a certain time period has elapsed. These thresholds may be dynamic, so that, e.g., they are higher at peak network times are relatively lower when the network is not busy.

To the extent that false positive results may be temporarily increased in the system 100 of FIG. 1, such increases may be eased by accurate sizing of the relevant BBFs, and/or by removing entries when they are explicitly queried. Thus, using the system 100 of FIG. 1, the system 100 may be parameterized in order to grant, e.g., the ability to prioritize network bandwidth, and/or at an acceptable false positive rate. Thus, the system 100 of FIG. 1 enables parameterization, so as, e.g., to grant the ability to prioritize network bandwidth, or the false positive rate.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions recorded on a non-transitory computer-readable medium, and executable by at least one hardware processor, the system comprising:
   an address manager configured to cause the at least one processor to select a blocked Bloom filter among a plurality of available blocked Bloom filters and map a data item among a plurality of data items to the selected blocked Bloom filter including hashing the data item according to a first hash function, and selecting the blocked bloom filter based on results of the first hash function, the data item defining a plurality of attributes, the plurality of attributes representing properties associated with the data item;
   a blocked Bloom filter generator configured to cause the at least one processor to generate individual Bloom filter blocks on an attribute per attribute basis for the selected blocked Bloom filter based on at least one second hash function and the plurality of attributes including generating an individual Bloom filter block for each attribute of the plurality of attributes of the data item such that the selected blocked Bloom filter includes the individual Bloom filter blocks and each individual Bloom filter block corresponds to a different attribute of the data item, each individual Bloom filter block including a plurality of hash results that corresponds to a specific attribute from execution of the at least one second hash function; and
   an integrity bloom filter generator configured to, for each individual Bloom filter block, apply a third hash function to the plurality of hash results that resulted from the execution of the at least the second hash function to obtain an integrity hash result,
   wherein integrity bloom filter generator is configured to store the integrity hash result within a separate filter of a corresponding individual Bloom filter block as an integrity Bloom filter.

2. The system of claim 1, wherein the hashing the data item according to the first hash function, and selecting the blocked bloom filter based on results of the first hash function includes:
   an address hash table configured to associate each data item of the plurality of data items to the plurality of available blocked Bloom filters, the address hash table mapping addresses in terms of hash value ranges to the available blocked Bloom filters,
   wherein the address manager is configured to hash the data item using the first hash function which is associated with the address hash table and select the blocked Bloom filter among the plurality of available blocked Bloom filters based on results of the first hash function and the mapped addresses of the available blocked Bloom filters.

3. The system of claim 1, wherein each hash value of the plurality of hash results is generated using a different second hash function.

4. The system of claim 1, wherein the integrity hash result ensures the attributes associated with a particular data item are identified in context of a corresponding individual Bloom filter block.

5. The system of claim 1, wherein the blocked Bloom filter generator is configured to generate each individual Bloom filter block of the selected blocked Bloom filter as a counting Bloom filter, the counting Bloom filter including multiple bits.

6. The system of claim 1, comprising a query handler configured to receive a request for the data item, and to return a positive indication of inclusion of the data item within the selected blocked Bloom filter, based on the mapping of the data item to the selected blocked Bloom filter of the plurality of available blocked Bloom filters.

7. The system of claim 1, comprising a query handler configured to receive a request for an attribute value corresponding to one of the plurality of attributes associated with the data item, and to return a positive indication of inclusion of the attribute value in the data item, based on the mapping of the data item to the selected blocked Bloom filter and on the attribute-specific blocked bloom filters that map each attribute to a different individual Bloom filter block.

8. The system of claim 1, wherein the blocked Boom filter generator is configured to receive a deletion request to delete the data item from the selected blocked Bloom filter, and further configured to identify the data item for deletion thereof, based on the mapping of the data item to the selected single blocked Bloom filter and on the attribute-specific blocked bloom filters that map each attribute to a different individual Bloom filter block.

9. The system of claim 1, wherein the blocked Bloom filter generator is configured to transmit, via a first connection, at least the selected blocked Bloom filter of the plurality of available blocked Bloom filters to a supervisor node for aggregation thereof with at least a second blocked Bloom filter.

10. The system of claim 9, wherein the blocked Bloom filter generator is configured to determine that the aggregation meets a threshold for aggregation at the supervisor node, and further configured to establish a second connection for subsequent aggregation of additional blocked Bloom filters of the plurality of available blocked Bloom filters.

11. The system of claim 1, wherein the blocked Bloom filter generator is configured to determine that a number of the plurality of available blocked Bloom filters has reached an acceptable limit for a rate of return of false positives for queries against the plurality of available blocked Bloom filters, and further configured to generate a new blocked Bloom filter in response to the determination.

12. The system of claim 1, wherein the blocked Bloom filter generator is configured to transmit a subset of the plurality of available blocked Bloom filters to a node processing queries against the plurality of available blocked Bloom filters, and further configured to identify the subset based on queries received via the node.

13. The system of claim 1, wherein a size of the individual Bloom filter blocks corresponding to a single blocked Bloom filter is dependent upon a number of distinct entries for each attribute of the plurality of attributes.

14. The system of claim 1, wherein the blocked Bloom filter generator is configured to create a hash for each attribute within the data item such that resulting attribute hash values are added to the corresponding individual Bloom filter blocks.

15. A computer-implemented method for executing instructions stored on a non-transitory computer readable medium, the method comprising:
   selecting a blocked Bloom filter among a plurality of available blocked Bloom filters and mapping a data item among a plurality of data items to the selected blocked Bloom filter including hashing the data item according to a first hash function, and selecting the blocked bloom filter based on results of the first hash function, the data item defining a plurality of attributes, the plurality of attributes representing properties associated with the data item; and
   generating individual Bloom filter blocks on an attribute per attribute basis for the selected blocked Bloom filter based on at least one second hash function and the plurality of attributes including generating an individual Bloom filter block for each attribute of the plurality of attributes of the data item such that the selected blocked Bloom filter includes the individual Bloom filter blocks and each individual Bloom filter block corresponds to a different attribute of the data item, each individual Bloom filter block including a plurality of hash results that corresponds to a specific attribute from execution of the at least one second hash function;
   applying, for each individual Bloom filter block, a third hash function to the plurality of hash results that resulted from the execution of the at least the second hash function to obtain an integrity hash result; and
   storing the integrity hash result within a separate filter of a corresponding individual Bloom filter block as an integrity Bloom filter.

16. The method of claim 15, wherein the hashing the data item according to the first hash function, and selecting the blocked bloom filter based on results of the first hash function includes:
   associating, within an address hash table, each data item of the plurality of data items to the plurality of available blocked Bloom filters including mapping addresses in terms of hash value ranges to the available blocked Bloom filters,
   hashing the data item using the first hash function which is associated with the address hash table and selecting the blocked Bloom filter among the plurality of available blocked Bloom filters based on results of the first hash function and the mapped addresses of the available blocked Bloom filters.

17. The method of claim 15,
   wherein each hash value of the plurality of hash values is generated using a different second hash function.

18. A computer program product, the computer program product being tangibly embodied on a non-transitory computer-readable medium and comprising instructions that, when executed, are configured to:
   select a blocked Bloom filter among a plurality of available blocked Bloom filters and map a data item among a plurality of data items to the selected blocked Bloom filter including hashing the data item according to a first hash function, and selecting the blocked bloom filter based on results of the first hash function, the data item defining a plurality of attributes, the plurality of attributes representing properties associated with the data item;
   generate individual Bloom filter blocks on an attribute per attribute basis for the selected blocked Bloom filter based on at least one second hash function and the plurality of attributes including generating an individual Bloom filter block for each attribute of the plurality of attributes of the data item such that the selected blocked Bloom filter includes the individual Bloom filter blocks and each individual Bloom filter block corresponds to a different attribute of the data item, each individual Bloom filter block including hash results that corresponds to a specific attribute from execution of the at least one second hash function;
   apply, for each individual Bloom filter block, a third hash function to the plurality of hash results that resulted from the execution of the at least the second hash function to obtain an integrity hash result; and
   store the integrity hash result within a separate filter of a corresponding individual Bloom filter block as an integrity Bloom filter.

19. The computer program product of claim 18, wherein each hash value is generated using a different second hash function.

20. The computer program product of claim 18, wherein the instructions, when executed, are configured to receive a request for the data item, and to return a positive indication of inclusion of the data item within the selected blocked Bloom filter, based on the mapping of the data item to the selected blocked Bloom filter of the plurality of available blocked Bloom filters.

21. The computer program product of claim 18, wherein the instructions, when executed, are configured to receive a request for an attribute value of the plurality of attributes, and to return a positive indication of inclusion of the attribute value in the data item, based on the mapping of the data item to the selected blocked Bloom filter and on the mapping of each attribute to the individual Bloom filter block of the selected blocked Bloom filter.

22. The computer program product of claim 18, wherein the instructions, when executed, are configured to receive a deletion request to delete the data item from the selected blocked Bloom filter, and further configured to identify the data item for deletion thereof, based on the mapping of the data item to the selected blocked Bloom filter and on the mapping of each attribute to the individual Bloom filter block of the selected blocked Bloom filter.

* * * * *